United States Patent [19]

Kring

[11] Patent Number: 5,549,319
[45] Date of Patent: Aug. 27, 1996

[54] TOE-IN ANGLE ADJUSTMENT FOR VEHICLE WHEELS

[75] Inventor: James T. Kring, Belleville, Mich.

[73] Assignee: L & W Engineering Company, Belleville, Mich.

[21] Appl. No.: 295,943

[22] Filed: Aug. 24, 1994

[51] Int. Cl.⁶ .................................................. B62D 17/00
[52] U.S. Cl. .............................. 280/661; 280/675; 403/4
[58] Field of Search .............................. 280/661 O, 675, 280/673; 403/3, 4; 364/424.05

[56] References Cited

U.S. PATENT DOCUMENTS

| | | |
|---|---|---|
| 4,453,733 | 6/1984 | Sautter et al. . |
| 4,650,208 | 3/1987 | Mason ...................................... 280/661 |
| 4,726,603 | 2/1988 | Sugiyama et al. ....................... 280/661 |
| 4,971,352 | 11/1990 | Jordan ..................................... 280/661 |
| 5,027,275 | 6/1991 | Sakamoto et al. . |
| 5,052,711 | 10/1991 | Pirkey et al. ........................ 280/675 X |
| 5,104,142 | 4/1992 | Tsubota et al. ...................... 280/675 X |

*Primary Examiner*—Lee Young
*Attorney, Agent, or Firm*—Barnes, Kisselle, Raisch, Choate, Whittemore & Hulbert, P.C.

[57] ABSTRACT

A toe-in angle adjustment mechanism is provided which comprises a geared adjustment plate that is attached to a suspension arm for a rear wheel. The adjustment plate has a bushing centrally mounted therein and is connected to the wheel spindle. A locking plate is provided to prevent unwanted frame movement of the wheel angle during adjustment. The locking plate has an access for a geared adjustment tool for engaging the teeth of the adjustment plate to pivot the adjustment plate and thus the spindle to adjust the toe-in angle of the wheel.

13 Claims, 3 Drawing Sheets

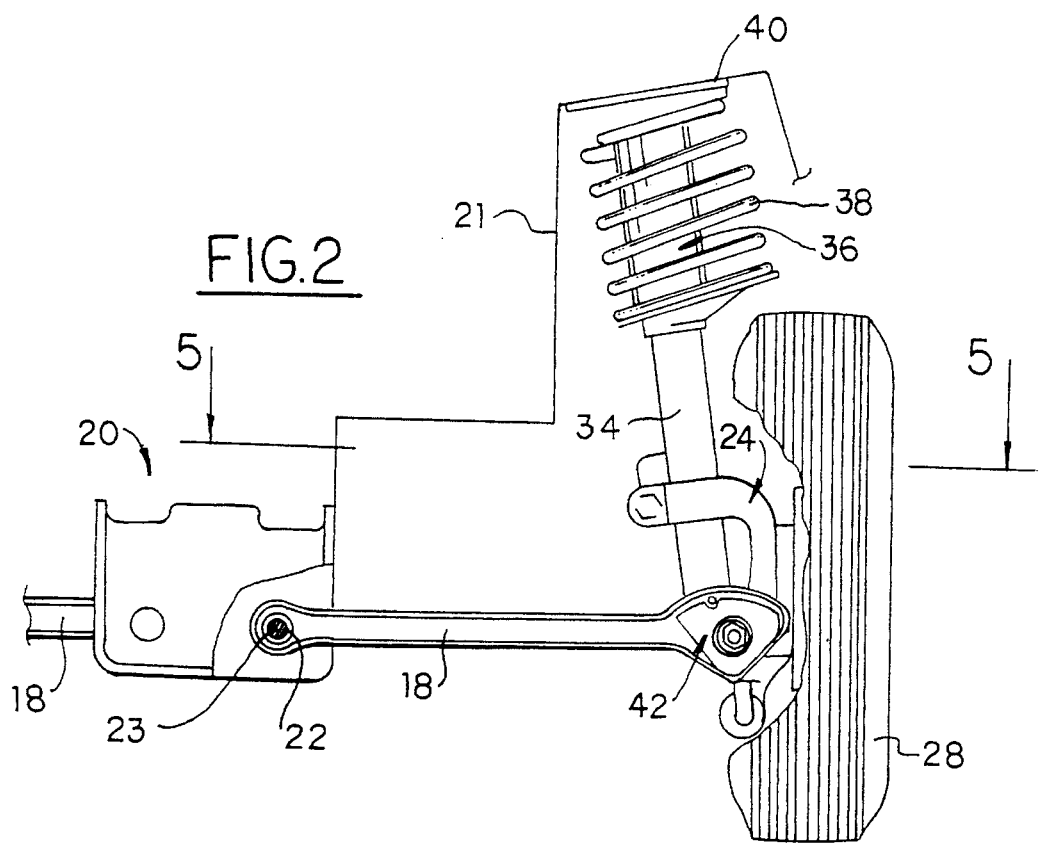
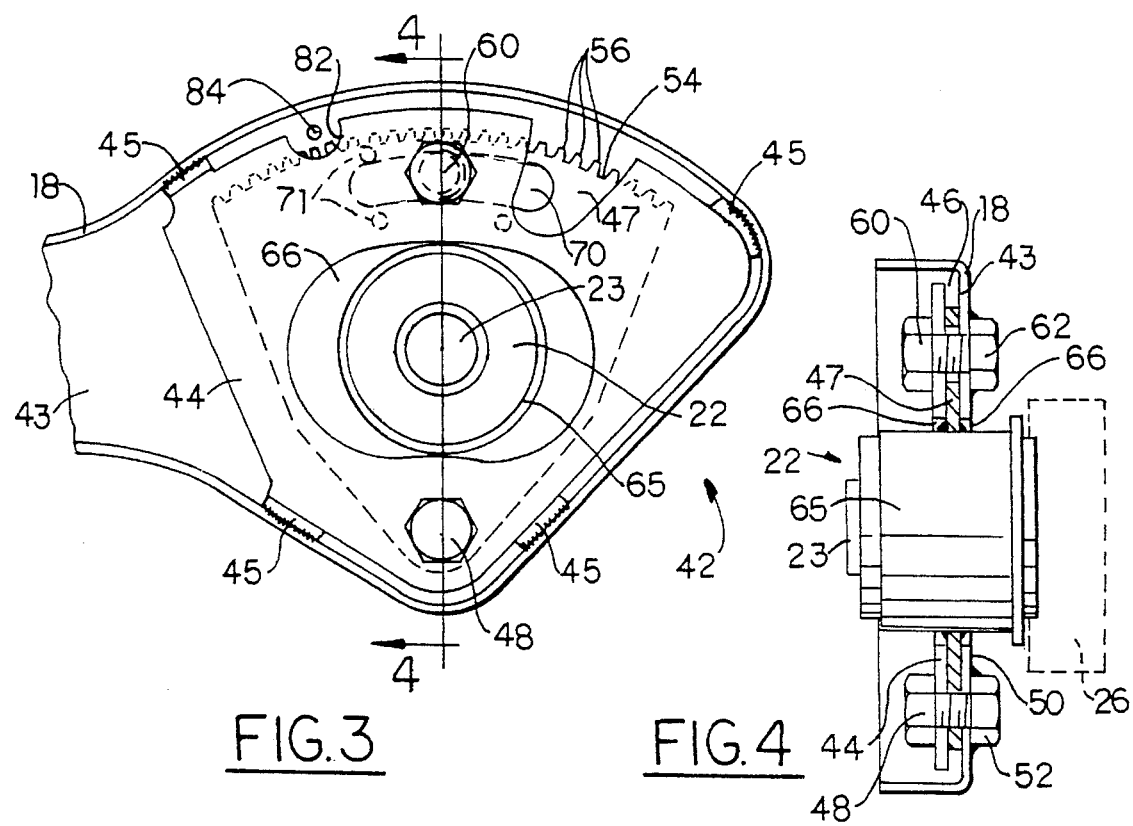

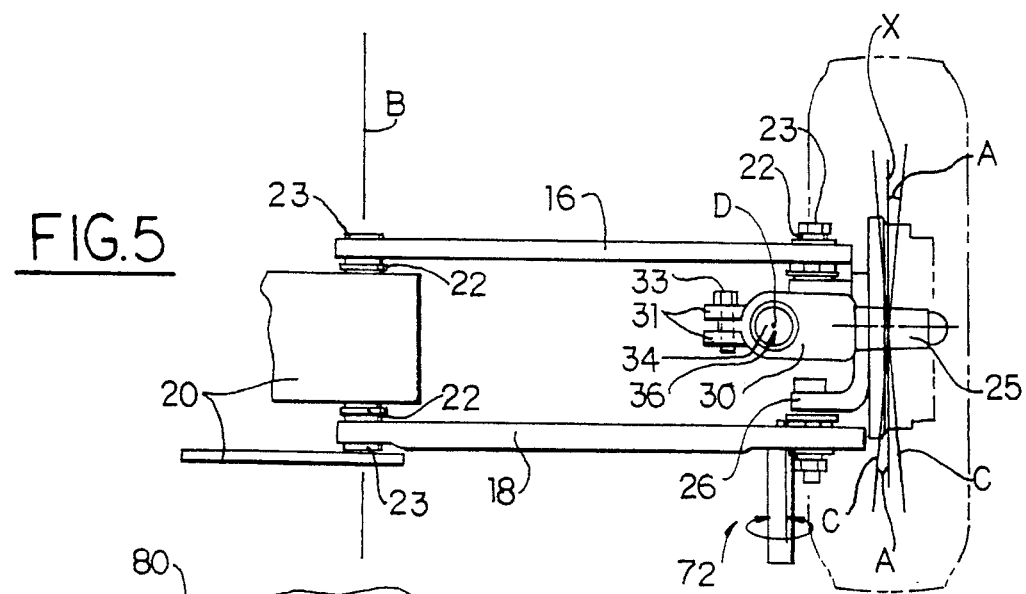
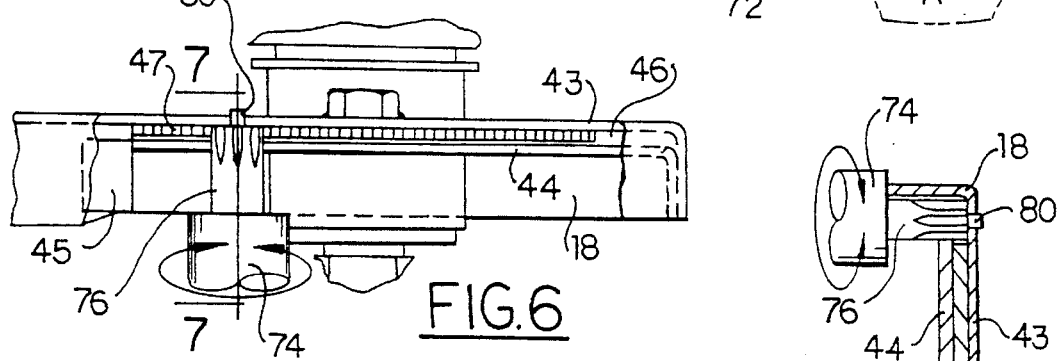
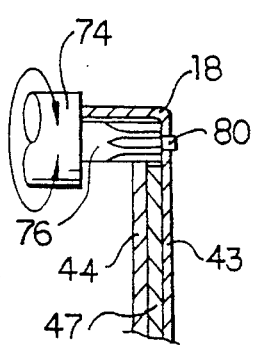
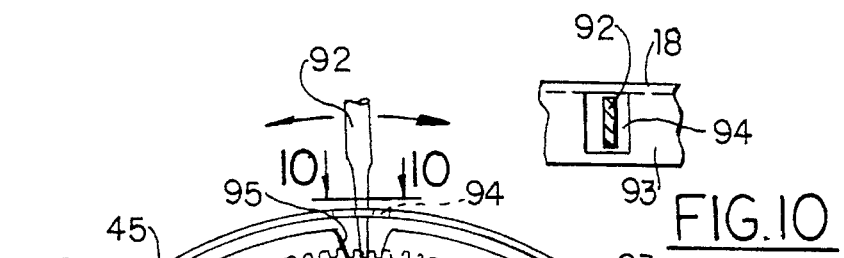
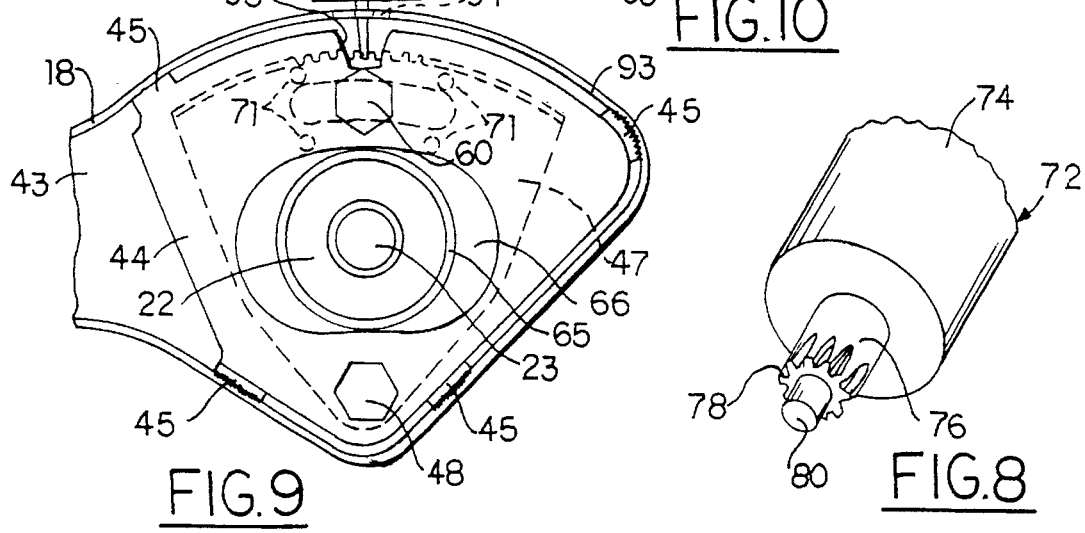
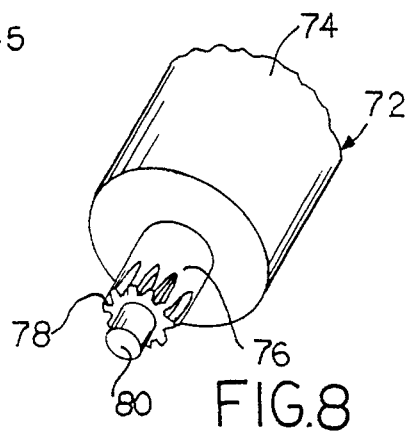

TOE-IN ANGLE ADJUSTMENT FOR VEHICLE WHEELS

FIELD OF THE INVENTION

This invention relates to a suspension system for vehicle wheels and more particularly to a toe-in angle adjustment mechanism for such wheels.

BACKGROUND OF THE INVENTION

In automotive vehicles, a wheel's travel pattern is controlled by its suspension geometry. The suspension layout employed to connect the individual wheels to the vehicle structure defines the suspension-linkage design. The linkage is pivotally connected through bushings to both the vehicle body and the wheel to allow the wheel to move vertically to compensate for irregularities in the road surface. The suspension design is determined by components, such as toe-in, defined as the angle between an axis extending parallel to the vehicle's longitudinal axis extending through the center pivot of the wheel and an axis through the center of the wheel. Toe-in compensates for forces exerted on the tire and keeps the wheels aligned preventing a condition known as dog tracking. Dog tracking is a condition where the rear wheels do not follow the front wheels preventing the vehicle from traveling squarely down the road.

Some automobiles do not have a wheel toe-in angle adjustment. The rear toe-in angle is set at the factory and built in during manufacturing. This is usually achieved by selecting a length for the suspension linkage and mounting the linkage through the bushings to the vehicle body and wheel. The bushings generally extend parallel to the vehicle centerline and have a central hole for a bolt for connection to the vehicle body and wheel. Each linkage extends transversely to the vehicle centerline so that each link pivots about the bushings. One problem that occurs in vehicles that lack rear toe-in angle adjustment is that if the wheels become misaligned due to, for instance, an automobile accident, there is no accurate way to realign the rear wheels. One attempt to correct this lack of adjustment feature was to provide special bushing kits to compensate for the misalignment. These special bushings have an off-center hole for the bolt which would replace the factory installed bushing connecting the linkage to the wheels. With these kits, one is only able to guess at the amount of misalignment and attempt to fit the offset bushing into the suspension to correct the misalignment. However, these kits are marginal at best and typically the wheels remain out of alignment.

Other vehicles do provide a mechanism for making a wheel toe-in adjustment. One such device is disclosed in U.S. Pat. No. 4,453,733 wherein a special swivel bearing is mounted to a torsion-proof arm and to a bracket secured to the vehicle body. A strut is connected at each end to the torsion-proof arm and to the bracket through ball and socket joints extending therebetween. Ball joint sockets are threaded into each end of the strut and provide a length-adjustment to change the toe-in angle of the wheel.

Another type of adjustment mechanism is disclosed in U.S. Pat. No. 5,027,275 which discloses a lateral link comprising an inner and outer lateral link member have a screw-threaded adjustment rod therebetween and a lock nut. The outer link is connected to a vehicle wheel. The toe-in angle is adjusted by loosening the lock nut and rotating the adjustment rod to shorten or lengthen the lateral link.

These devices are generally very expensive to manufacture, are time consuming to assemble and adjust, and are not adapted to be retrofit to existing automobile suspensions.

SUMMARY OF THE INVENTION

A toe-in angle adjustment mechanism for vehicle wheels is provided which comprises a stamped flat metal adjustment plate with a bushing mounted approximately centrally therein. This device is attached to the outer end of a rear suspension arm with the bushing connected to the rear spindle. The adjustment plate has a curved outer edge with gear teeth thereon and is secured to the suspension arm to be pivoted thereabout. A locking plate is attached to the suspension arm in overlying relation to cover the adjustment plate and prevent unwanted free movement of the adjustment plate and thus the wheel spindle during adjustment. The locking plate and suspension arm have access openings for a tool so that when adjustment is necessary, the tool can be inserted into the openings to engage the gear teeth on the adjustment plate to pivot the plate which, through the bushing and spindle, moves the wheel to adjust the toe-in angle.

Objects, features, and advantages of this invention are to provide a toe-in angle adjustment mechanism for vehicle wheels that can be installed during manufacture of the vehicle or which can be retrofit on vehicles that do not have toe-in angle adjustments, which is easy to install, easy to operate, and is simple in design, stable, rugged, durable, reliable, and economically manufactured.

BRIEF DESCRIPTION OF THE DRAWINGS

FIG. 2 is a view taken along line 2—2 in FIG. 1 looking toward the front of the vehicle;

FIG. 3 is an enlarged cut-away view of the toe-in angle adjustment mechanism;

FIG. 4 is a view taken along line 4—4 in FIG. 3;

FIG. 5 is a partial top view taken along the line 5—5 of FIG. 2 with the adjustment tool in place;

FIG. 6 is an enlarged cut-away top view of the adjustment mechanism and tool;

FIG. 7 is a view taken along line 7—7 in FIG. 6;

FIG. 8 is a partial perspective view of the adjustment tool;

FIG. 9 is a view similar to FIG. 3 showing a different embodiment of the invention; and FIG. 10 is a view taken along line 10—10 in FIG. 9.

DESCRIPTION OF THE PREFERRED EMBODIMENTS

Figure 1:
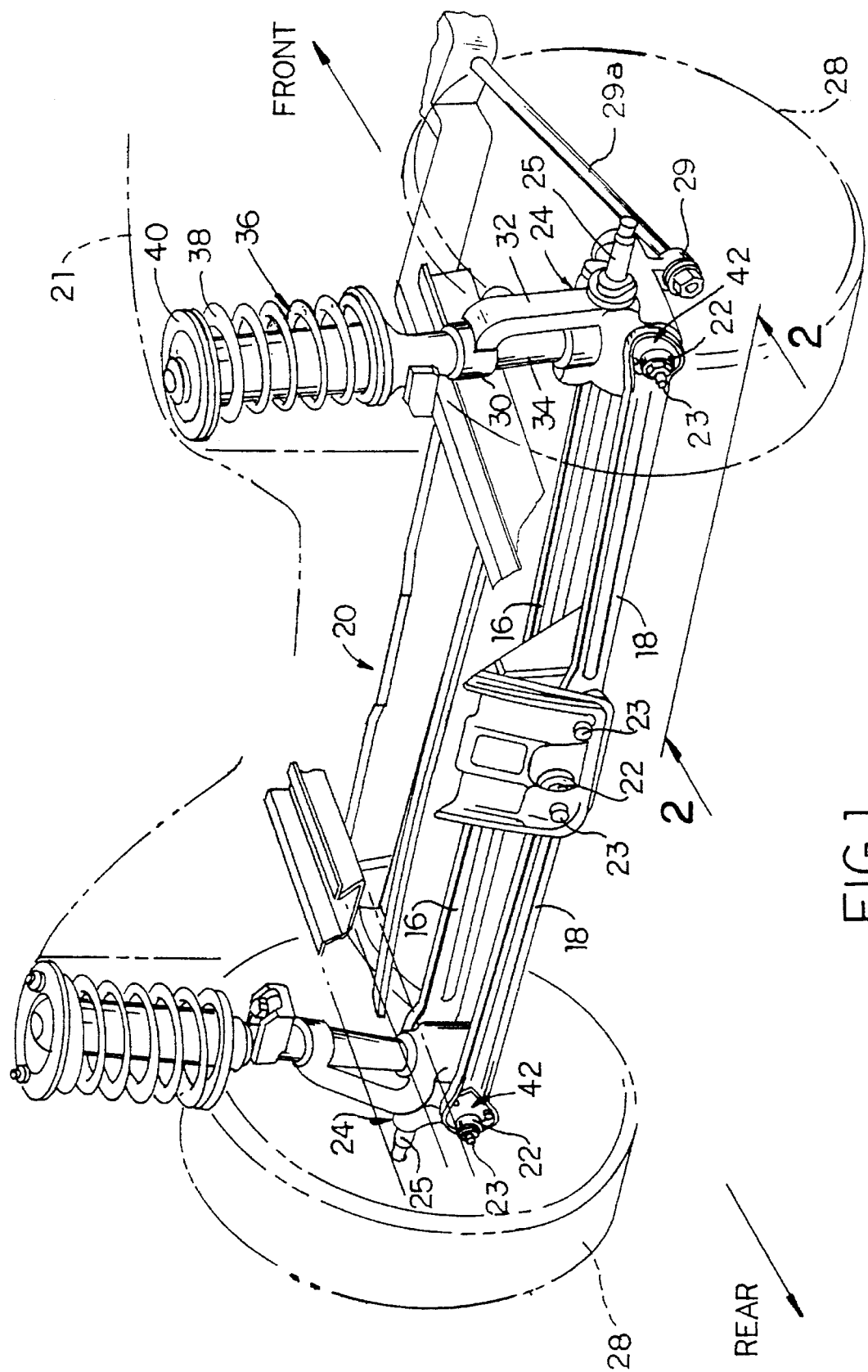
FIG. 1 is a perspective view of a rear suspension system for an automotive vehicle which employs the toe-in adjustment mechanism embodying this invention.

Referring now to the drawings, and in particular to FIGS. 1 and 2, a rear suspension system for supporting the wheels of a vehicle on the vehicle frame 20 is shown. The rear suspension for each wheel comprises two parallel pivoting suspension arms 16 and two parallel pivoting suspension arms 18, each pivotally connected to the vehicle body 20 on the longitudinal centerline of the vehicle through a rubber bushing 22 fastened to the body 20 by bolts 23. The vehicle body 21 (shown in phantom in FIG. 1) is rigidly secured to the vehicle frame 20. Each arm 16 and 18 extends laterally outwardly from the body 21 and at its outer end is connected to a spindle unit 24 through a rubber bushing 22. The arms 16 and 18 extend laterally outwardly in both directions, with spindle units 24 at both ends. Since these spindle units and associated structure are the same, a description of one will suffice for both. The spindle unit 24 comprises a U-shaped bracket 26 (FIG. 5) having a spindle 25 which rotatably supports the wheel 28. One end of the bracket 26 is pivotally attached to the front suspension arm 16 and the other end is pivotally and adjustably attached to the rear suspension arm 18. The spindle unit 24 includes a downwardly extending lower collar 29 having an axis extending parallel to the vehicle centerline. The lower collar 29 receives and secures one end of a tension strut 29a that extends in a direction substantially parallel to the vehicle centerline. The other end of the tension strut 29a is bolted or otherwise secured to the vehicle frame 21 to ensure that the wheel is pulled or follows the vehicle when irregularities in the road surface such as large holes or bumps are encountered. The spindle unit 24 also has an upper collar 30 and support 32 that extends upwardly from the spindle unit 24. The upper collar 30 has a generally vertical axis extending perpendicular to the vehicle centerline. As seen in FIGS. 2 and 5, the upper collar 30 has a through passage which receives the lower end of rod 34 of a shock absorber 36. The collar 30 is split along one side of the opening providing spaced tabs 31 which are clamped together by a nut and bolt assembly 33 to securely clamp the rod 34 to the upper collar 30. A coil spring 38 surrounds the upper portion of rod 34 of shock absorber 36 and is secured at its lower end to the rod 34 intermediate the ends thereof and at its upper end to a ring plate 40 which is secured to the vehicle body 21 (FIG. 2).

The adjustment of the toe-in angle of the wheels 28 is accomplished through an adjustment mechanism 42 that is connected to the spindle unit 24 through the rear suspension arm 18. The adjustment mechanism 42 is the same for both wheels and accordingly only one will be described.

This connection is shown more clearly in FIGS. 3 and 4 where it can be seen that the toe-in angle adjustment mechanism 42 is connected both to a flat portion 43 on the outer end of rear suspension arm 18 and to the spindle bracket 26. The adjustment mechanism 42 comprises a flat locking plate 44 secured in overlying relation to the flat portion 43 by tabs 45 welded or otherwise secured to the flat portion 43 leaving a gap 46 therebetween. A flat adjustment plate 47 that preferably has been stamped from sheet metal material is sandwiched between the flat portion 43 of the arm 18 and the locking plate 44. The adjustment plate 47 is pivotally mounted on a fastener such as a bolt 48. The bolt 48 extends through aligned holes in the flat portion 43, adjustment plate 47 and locking plate 44 and is threadably received in a weld nut 52 welded or otherwise secured to the outer surface 50 of the flat portion 43. The adjustment plate 47 has a curved upper edge 54 extending in an arc centered on bolt 48 and formed with a series of teeth 56. A bolt 60 secured by weld nut 62 to flat portion 43 is located near the curved outer edge 54 on which teeth 56 are formed. The bolt 60 extends through mounting holes in the flat portion 43 and locking plate 44 and through an arcuate slot 70 in the adjustment plate 47 and is threadably received in the weld nut 62 secured to the flat portion 43. The slot 70 will allow swiveling of the adjustment plate 47 about the bolt 48 when the bolts 48 and 60 are loosened. When the wheel 28 has been adjusted to the desired angle, the bolts 48 and 60 are tightened to lock the adjustment plate 47 in its adjusted position. The flat portion 43 of the arm 18 and the adjustment plate 47 are parallel and disposed in vertical planes perpendicular to the longitudinal centerline of the vehicle.

The rubber bushing 22 is enclosed in a housing 65 that is welded or otherwise fixedly secured to the adjustment plate 47. The bushing 22 and housing 65 extend through registering, generally horizontal, arcuate slots 66 in both the flat portion 43 of the suspension arm 18 and in the locking plate 44. The bushing 22 is secured to the spindle bracket 26 by the bolt 23.

A plurality of friction nubs 71 are formed on the locking plate 44 facing the adjustment plate 47 and located symmetrically about the bolt 60 to frictionally engage the facing surface of the adjustment plate 47. The nubs 71 exert a friction force on the adjustment plate 47 that prevents unwanted movement of the adjustment plate 47 but can be easily overcome during adjustment. Thus, the nubs 71 simply hold the adjustment plate 47 in place during incremental movement thereof.

The bolt 48 on which the adjustment plate 47 turns extends parallel to the longitudinal centerline of the vehicle. The adjustment plate 47 pivots on the bolt 48 in a vertical plane perpendicular to the longitudinal centerline of the vehicle. Hence, the spindle mounting bracket 26, which is connected to the bushing 22 on the adjustment plate 47, twists or pivots about the vertical axis D (FIG. 5) through the upper collar 30 when the adjustment plate 47 pivots, to adjust the toe-in angle of the spindle 25 and of the wheel 28. The toe-in angle A, seen in FIG. 5, is the angle between an axis X extending parallel to the vehicle body axis B and an axis C extending through the toed-in or toed-out wheel center.

The suspension arms 16 and 18 are connected at their ends to both the vehicle body 20 and spindle bracket 26 through flexible rubber bushings 22 and are allowed a certain amount of play to allow the spindle bracket 26 to move when toe-in angle is adjusted. The rod 34 of the shock absorber 36 is subjected to a small torsional load since the upper collar 30 is securely clamped thereto. However, this load is minimal and does not prevent pivoting of the spindle bracket 26.

An adjustment tool 72 is employed to pivot the adjustment plate 47 and thus change the toe-in angle of the wheel 28. The adjustment tool 72 is preferably in the form of a cylindrical body 74 having a concentric integral shaft 76 of reduced diameter at one end formed with gear teeth 78 around its periphery. Extending beyond the geared shaft 76 is a locator pin 80.

The locking plate 44 has a recess 82 (FIG. 3) which exposes the gear teeth 56 on the adjustment plate 47 to receive the shaft 76 of the adjustment tool 72. The suspension arm 18 has a hole 84 located centrally with respect to recess 82 to receive the locator pin 80 of the adjustment tool 72 and thus locate the adjustment tool 72 for use.

When the locator pin 80 is inserted in the hole 84 of the suspension arm 18, recess 82 will clear shaft 76, and the teeth 78 on the shaft 76 will mesh with the teeth 56 on the adjustment plate 47 so that rotation of the adjustment tool 72 in either direction (shown by arrows in FIGS. 5 through 7) will result in the above described arcuate movement of the adjustment plate, which causes the spindle unit 24 to pivot about its axis D to change the toe-in angle A of the wheel 28.

It is preferable that the adjustment mechanism be located on the rear suspension arm 18. Automobile manufacturers usually design the rear suspension arm so that, in case of failure caused by excessive forces, the rear suspension arm 18 deforms instead of breaking off completely. This deformation causes a wobbling or castering effect on the wheel to indicate damage to the driver. Thus, the arm 18 and the adjustment mechanism remain connected to the vehicle body and the adjustment mechanism is substantially protected from damage or destruction caused by breakage.

FIGS. 9 and 10 show an alternative embodiment the operation of which is essentially the same as that of the previous embodiment with the main difference being the tool used to pivot the adjustment plate and the access in the adjustment mechanism for the tool. In this embodiment, adjustment can be made with a screwdriver or similar tool 92. The sidewall portion 93 of the flat portion 43 of the suspension arm is provided with a slot 94 through which the screwdriver may be inserted so that the tip of the screwdriver engages the adjustment plate 47 between the teeth 56. The locking plate 44 has a recess 95 to accommodate the screwdriver tip. The screwdriver is then shifted in the desired direction as shown by arrows in FIG. 9 to pivot the adjustment plate the desired amount and thus adjust the toe-in angle.

In summary, an adjustment mechanism is provided that can be easily installed during manufacture or retrofit to existing vehicles. The adjustment mechanism is easily accessible once installed, simple to adjust, and is economical to manufacture thus overcoming the complications and expense of existing devices.

While this invention has been described in terms of certain embodiments thereof, it is not intended that it be limited to the above description, but rather only to the extent set forth in the following claims.

The embodiments of the invention in which an exclusive property or privilege is claimed are defined in the claims.

I claim:

1. A suspension system and toe-in angle adjustment mechanism for a rear wheel on a vehicle comprising:
   a. a wheel support connected to a vehicle body along a vertical axis for rotatably supporting a wheel about a horizontal axis;
   b. first and second spaced parallel suspension arms having opposed ends, each of said arms being pivotally connected at one end to a central portion of the vehicle body, extending laterally thereof and connected at the opposite end to said wheel support; and
   c. a toe-in angle adjustment mechanism connected to said wheel support and pivotally mounted on the opposite end of one of said first and second suspension arms about an axis extending perpendicular to the rotational axis of the wheel; said toe-in angle adjustment mechanism comprising a pivot plate member connected to said wheel support through a bushing member extending through said pivot plate member, wherein said pivot plate member is generally triangular having an apex at one end and a curved outer edge opposite the apex, said pivot plate member being pivotally mounted on said wheel support at said apex and having a plurality of teeth on the curved outer edge engageable with an adjustment tool for changing the toe-in angle of the wheel, so that, as said adjustment mechanism is pivoted about said adjustment axis, said wheel support and thus the wheel are pivoted about the vertical axis along which the wheel support is connected to said vehicle body to change the toe-in angle of the wheel.

2. The suspension system and toe in angle adjustment mechanism of claim 1 comprising a locking plate connected to the opposite end of one of said first and second suspension arms and overlying said pivot plate member, said locking plate having a slot through which said bushing member extends, said slot allowing movement of said bushing therein as said pivot plate member pivots, and having an outer edge closely adjacent the curved outer edge of said pivot plate member.

3. The suspension system and toe-in angle mechanism of claim 2 wherein said pivot plate member and said locking plate are connected to said one of said first and second arms by first and second bolts, said first bolt being located at the apex of said pivot plate member and said second bolt being located adjacent the curved edge of said pivot plate member, said pivot plate member having a slot through which said second bolt extends.

4. The suspension system and toe-in angle adjustment mechanism of claim 3 wherein said locking plate comprises a plurality of friction nubs to frictionally engage said pivot plate member and hold said pivot plate member in place during adjustment.

5. The suspension system of claim 4 wherein said nubs are symmetrically located about said second bolt.

6. The suspension system of claim 2 comprising access means for gaining access to the teeth on said pivot plate member for adjustment thereof.

7. The suspension system of claim 6 wherein said access means comprises an opening in one of said first and second arms located adjacent the teeth on said pivot plate member.

8. The suspension system of claim 6 wherein said access means comprises at least one opening at said outer edge of said locking plate to expose the teeth on said pivot plate member to an adjustment tool.

9. The suspension system of claim 5 wherein said access means comprises a locating hole in said one of said first and second arms adjacent the opening at said outer edge of said locking plate to locate an adjustment tool.

10. The suspension system of claim 8 wherein said adjustment tool comprises a rotatable body having gear teeth at one end for engagement with the teeth on said pivot plate member.

11. The suspension system of claim 8 wherein said adjustment tool comprises a body having a flattened end portion for engagement with said pivot plate member between the teeth thereof.

12. Toe angle adjustment apparatus for a wheel of a vehicle comprising:
   a. a support structure;
   b. a spindle unit connected to said support structure having a spindle for mounting the wheel for rotation;
   c. a first plate mounted on said support structure:
   d. a second plate mounted between said first plate and said support structure;
      i. said second plate pivotally connected to said first plate by a pivotal connection; and
      ii. wherein said second plate has a series of teeth extending in an arc, centered on said pivotal connection, a key locator on said first plate adjacent said series of teeth, and a key rotatably engageable with said locator and having teeth adapted to mesh with the series of teeth on said second plate to adjust said second plate relative to said first plate when the key is rotated;
   e. means securing the spindle unit to said second plate; and
   f. means for clamping the second plate to the first plate in an adjusted position as determined by the desired toe angle of the spindle and wheel.

13. A suspension system and toe-in angle adjustment for a vehicle wheel comprising:
   a. a wheel support connected to a vehicle body for rotatably supporting a wheel about a horizontal axis;
   b. a support arm connected at one end to the vehicle body and connected at the opposite end to said wheel support:

c. a first plate mounted on said support arm;
d. a second plate between said support arm and said first plate;
  i. a pivotal mount between said first and second plates so that said second plate can pivot about said mount with respect to said first plate;
  ii. wherein said second plate has a series of teeth extending in an arc, centered on said pivotal mount, a key locator on said first plate adjacent said series of teeth, and a key rotatably engageable with said locator and having teeth adapted to mesh with the series of teeth on said second plate to adjust said second plate relative to said first plate when the key is rotated;
e. a connector for attaching said wheel support to said second plate; and
f. fasteners for clamping said second plate between said first plate and said support arm in an adjusted position as determined by the desired toe angle of said wheel.

* * * * *